(12) United States Patent
Mai et al.

(10) Patent No.: US 12,469,335 B2
(45) Date of Patent: Nov. 11, 2025

(54) ONBOARD VEHICLE DATA COLLABORATION FOR ANALYSIS AND RESPONSE

(71) Applicant: CARIAD SE, Wolfsburg (DE)

(72) Inventors: David Mai, Bellevue, WA (US); Edson Fangwa Nzeya, Wolfsburg (DE); Sandeep Kumar Patil, Botheil, WA (US)

(73) Assignees: CARIAD SE, Wolfsburg (DE); Audi AG, Ingolstadt (DE)

( * ) Notice: Subject to any disclaimer, the term of this patent is extended or adjusted under 35 U.S.C. 154(b) by 380 days.

(21) Appl. No.: 17/523,875

(22) Filed: Nov. 10, 2021

(65) Prior Publication Data

US 2023/0147896 A1     May 11, 2023

(51) Int. Cl.
*G07C 5/00*     (2006.01)
*G07C 5/08*     (2006.01)

(52) U.S. Cl.
CPC ........... *G07C 5/008* (2013.01); *G07C 5/0808* (2013.01); *G07C 5/0816* (2013.01)

(58) Field of Classification Search
CPC ..... G07C 5/008; G07C 5/0808; G07C 5/0816
See application file for complete search history.

(56) References Cited

U.S. PATENT DOCUMENTS

| 9,967,329 B2 | 5/2018 | Reber |
| 2015/0277942 A1 | 10/2015 | Rork et al. |
| 2016/0050356 A1* | 2/2016 | Nalepka ............... H04N 7/181 |
| | | 348/148 |
| 2017/0103327 A1 | 4/2017 | Penilla et al. |
| 2018/0167797 A1* | 6/2018 | Hans ................. H04L 65/762 |
| 2018/0232959 A1 | 8/2018 | Thornburg et al. |
| 2019/0279440 A1* | 9/2019 | Ricci .................. H04W 4/48 |

(Continued)

OTHER PUBLICATIONS

Y. Du et al., "A Distributed Message Delivery Infrastructure for Connected Vehicle Technology Applications," in IEEE Transactions on Intelligent Transportation Systems, vol. 19, No. 3, pp. 787-801, Mar. 2018, doi: 10.1109/TITS.2017.2701799. (Year: 2018).*

(Continued)

*Primary Examiner* — Tarek Elarabi
(74) *Attorney, Agent, or Firm* — Shield Intellectual Property PC; Kirk D. Wong

(57) ABSTRACT

Approaches, techniques, and mechanisms are disclosed for large scale vehicle data collaborative analysis. According to one embodiment, a large amount of data streams is received from a multitude of vehicles. A distributed event streaming system is applied to parse the data streams based on an attribute, such as time sensitive data, location-specific data, or vehicle maintenance, operational, or fault-prevention data. A data container platform instance hosts applications that receive the parsed data streams. Output of an application is transformed into data streams having a common topic. Other applications may access the data streams by topic. Upon receiving an indication that an application has processed a data stream by topic, a decision point may be reached and executed by an external application, triggering an action on a vehicle from the multitude of vehicles. A vehicle computing system accesses topic data streams and performs an action on the vehicle.

20 Claims, 10 Drawing Sheets

(56) References Cited

U.S. PATENT DOCUMENTS

| | | |
|---|---|---|
| 2020/0175788 A1 | 6/2020 | Park et al. |
| 2020/0310413 A1 | 10/2020 | Zhao et al. |
| 2020/0364953 A1 | 11/2020 | Simoudis |
| 2021/0192867 A1 | 6/2021 | Fang et al. |
| 2022/0247695 A1 | 8/2022 | Kulkarni et al. |
| 2023/0073566 A1* | 3/2023 | Sivasithambaresan ............... H04L 67/12 |
| 2023/0143923 A1 | 5/2023 | Mai et al. |

OTHER PUBLICATIONS

M. H. Siddiqi et al., "Dynamic Priority-Based Efficient Resource Allocation and Computing Framework for Vehicular Multimedia Cloud Computing," in IEEE Access, vol. 8, pp. 81080-81089, 2020, doi: 10.1109/ACCESS.2020.2990915. (Year: 2020).*

Siddiqi et al., "Dynamic Priority-Based Efficient Resource Allocation and Computing Framework for Vehicular Multimedia Cloud Computing", IEEE Access, Apr. 28, 2020.

United States Patent and Trademark Office, U.S. Appl. No. 17/523,882, Non-Final Office Action dated Mar. 28, 2024.

United States Patent and Trademark Office, U.S. Appl. No. 17/523,882, Notice of Allowance dated Oct. 17, 2024.

\* cited by examiner

ONBOARD VEHICLE DATA COLLABORATION FOR ANALYSIS AND RESPONSE

TECHNICAL FIELD

Embodiments relate generally to large scale data processing, and, more specifically, to techniques for large scale collaboration of computing applications for vehicle data analysis and response.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern vehicles generate a multitude of time sensitive and non-time sensitive data, useful for many computing applications, from geolocation specific applications to insurance applications. However, capturing large scale vehicle data has been a challenge. Nevertheless, various methods have been developed to facilitate data capture and analysis. These approaches include, but are not limited to, various frameworks and systems for implementing vehicular multimedia cloud computing that exhibit varying degrees of specificity concerning the challenges of integrating vehicles with cloud computing, specifically related to processing of multimedia content that affect performance of vehicular communication. Challenges related to managing large scale collaboration of a multitude of data streams have not been addressed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
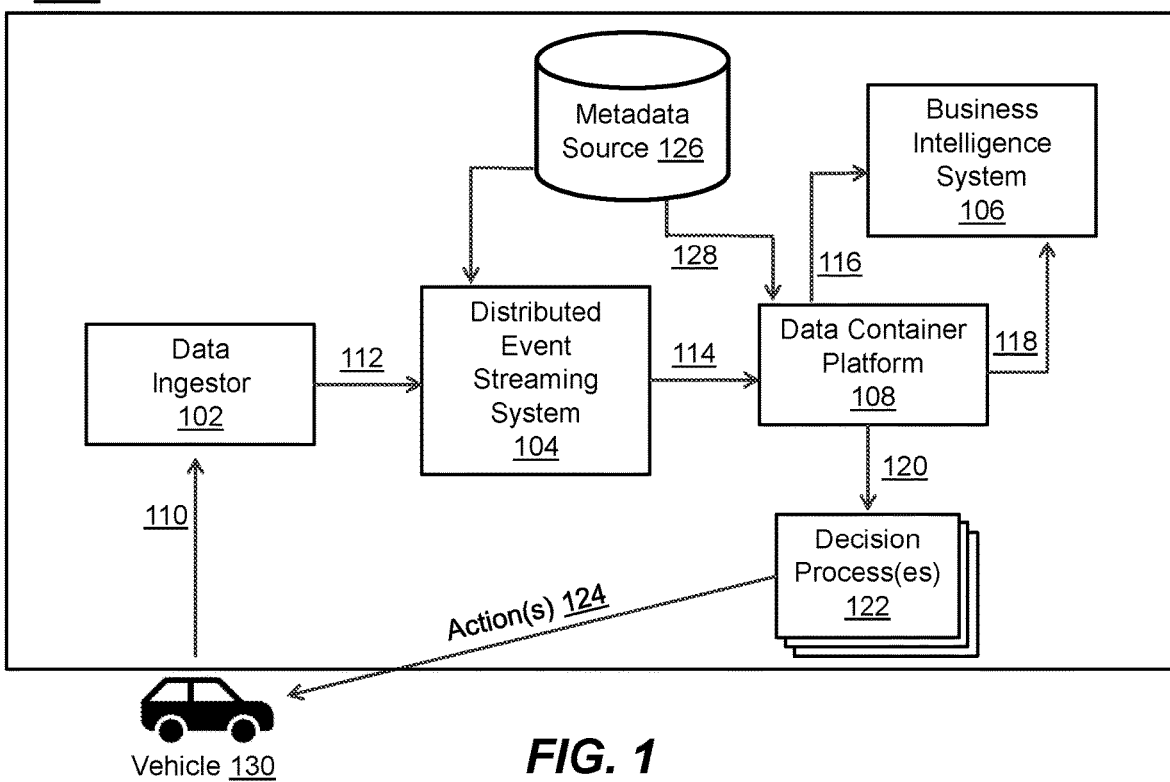
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
    2.1. Data Container Platform
    2.2. Distributed Event Streaming System
    2.3. Business Intelligence System
    2.4. Decision Processes
    2.5. Miscellaneous
3.0. Functional Overview
    3.1. Multi-layered Large Scale Data Collaboration
    3.2. Shared Resources at the Data Container Platform
    3.3. Computing Paths Using Flexible Message Routing
    3.4. Real Time Vehicle Data Driven Decisioning
4.0. Example Process Flows
5.0. Implementation Mechanism—Hardware Overview
6.0. Extensions and Alternatives

1.0. General Overview

Techniques as described herein can be used to implement large scale collaboration for vehicle data analysis and response generation. The data container platform combines a distributed event streaming system and various applications for the purpose of data analysis and response generation for vehicular data. As used herein, vehicular data refers to a mix of real-time, or time sensitive data and non-time sensitive data that is generated from one or more computing systems at a vehicle. Using a Lambda Architecture Framework and event stream processing, massive amounts of data may be processed by taking advantage of both batch and stream processing methods. Large scale data collaboration as described herein may include but is not necessarily limited to data ingestion, validation, and processing to make vehicular data available to computing applications through one or more application programming interfaces. Data parsing as described herein refers to using one or more computing devices to perform data processing that separates data items in a data stream based on an attribute of the data (e.g., data attribute, etc.). Example data attributes may include, but are not necessarily limited to only, any of: time-sensitive data, non-time sensitive data, geolocation data, mechanical vehicular data, operational vehicular data, other metadata related to vehicles, etc. Example data parsing methods include but are not necessarily limited to clustering methods, temporal data filtering, geographic location tags, etc.

In some operational scenarios, one or more cloud computing systems can be used to provide a distributed event streaming system. A distributed event streaming system may provide data parsing capabilities based on various data attributes using one or more cloud computing systems. A standard messaging protocol, such as Message Queuing Telemetry Transport (MQTT), is used to validate data streams. In a MQTT messaging solution, the MQTT broker uses the topic of a message to decide which client receives which message. Each message, or data item, has a topic, or a character string that the broker uses to filter messages.

Under techniques as described herein, metadata may be used in a data container platform to facilitate large scale data collaboration and enrich vehicular data ingested and validated. Such metadata may include geographical information, landmarks, mapping data, weather forecast data, road condition data, etc.

A mix of data received from vehicles includes both time sensitive data and non-time sensitive data. After the data is ingested and validated, a distributed event streaming system can parse time sensitive data and non-time sensitive data and make the data items available for consumption through one or more application programming interfaces. In an embodiment, parsed data may be sent directly to a specified application.

Once parsed, various applications may consume and transform the data for re-use by other applications. The distributed event streaming system may generate a label, such as a topic, to track the output of applications. Herein, a topic data stream is a data stream, or a plurality of data items, that have the same topic. Applications can be publishers to a topic, creating messages and sending (publishing) them to the messaging solution or service on a specified topic. Applications may also be subscribers of a topic, receiving messages on a specified subscription.

This approach allows a large-scale data collaboration as described herein to aggregate and analyze vehicular data to produce actions based on the processed data. Applications may be developed as independent computing nodes that have full control of their logics, using any programming language of the developer's choice and have flexibility to collaborate with any other computing nodes (e.g., other applications, etc.) without incurring significant overhead and creates a layered computing scheme that allows incremental innovation by reusing the existing code base. Additionally, optionally or alternatively, this approach allows the data container platform to ingest and process vehicular data at scale and to provide a platform for a wide variety of applications to access time-sensitive data and produce an action, or generated response, at one or more vehicles in near real-time.

Real time data processing and response generation as described herein can be used to provide analysis for large scale data collaboration, including but not limited to vehicular operations, in a variety of industries and/or real-world applications. Once data analysis is completed on any processing path of one or many computing nodes, a response, or action, can be generated, such as updating vehicle firmware, notify external systems, and so forth. This automates the entire data and action flow between all computing nodes, thus increasing efficiency and reducing response time while consuming large amounts of data in real time from vehicles.

Approaches, techniques, and mechanisms are disclosed for large scale collaboration for computing applications. According to one embodiment, data streams are received from a multitude of vehicles. The data streams are parsed based on an attribute. The parsed data stream is transformed into a topic data stream. Access to the topic data stream is enabled through an application programming interface. An application accesses the topic data stream and sends an indication of an event that occurred based on the topic data stream. The indication of the event is sent to a decision process that causes an action, or generated response, to be performed at a vehicle of the multitude of vehicles.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises one or more computing devices. The one or more computing devices comprise any combination of hardware and software configured to implement the various logical components described herein, including components such as data container platform 108, data ingestor 102, distributed event streaming system 104, decision process(es) 122, business intelligence system 106, metadata source 126, and computing devices on vehicle 130. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Data Container Platform

System 100 comprises a data container platform 108 that operates with one or more computing applications to enable large scale data collaboration for processing vehicular data and generating responses based on data analysis. Example applications that may interact with data on the data container platform 108 may include, but are not limited to only, any of: data analysis, data transformation, latency-critical diagnostics, vehicle monitoring, malfunction, pattern detection, dynamic event-based data source configuration, complex time and/or location-based vehicle data anonymization, on-demand provisioning of data processing stacks, dynamic workload provisioning, different cluster sizing, data infrastructure efficiency improvements, etc.

Data containers as described herein may be generated and processed for a relatively large set of data streams, which may include a mix of different types of data, including time sensitive data, non-time sensitive data, geographic location-specific data, vehicle monitoring data, vehicle operational data, etc. In some operational scenarios, vehicular data streams 110 are transmitted from a vehicle 130 and received by a data ingestor 102. For example, vehicular data streams 110 such as bulk data streaming from applications at the vehicle 130 are transmitted through one or more communications systems located within the vehicle 130 that are capable of connecting to a network, such as cellular networks, WIFI networks, etc., that is further connected to a system that includes the data ingestor 102. As another example, vehicular data streams 110 may be transmitted through other devices communicatively coupled to the vehicle 130, such as a mobile device connected through Bluetooth or through physical wire, such that the vehicular data streams 110 are transmitted through a network connected to the mobile device. The data ingestor 102 validates and sends the validated data streams 112 to the distributed event streaming system 104 through a network. The distributed event streaming system 104 parses the validated data streams 112 into accessible data items 114 based on an attribute, such as time-specific or location specific data. The accessible data items 114 are then made available to applications in the data container platform 108 for transformation and further processing.

A metadata source 126 may provide metadata 128 to the data container platform 108 to provide more information to applications within the data container platform 108. For example, a metadata source 126 may include mapping data associated with geographic location-specific data such that if an accessible data item 114 comprises a specific geographic location-specific data item, the associated mapping data, such as a graphical representation of the location-specific data, may be retrieved from the metadata source 126. Other metadata sources 126 may include, but are not limited to, any one of: a dictionary of vehicle related terms, a multimedia data source associated with music streaming, a weather forecast metadata source, commercial retail locations of interest based on location, etc.

Metadata source 126 may also include information on how to transform data within the distributed event streaming system 104. For example, after receiving data item 112, the distributed event streaming system 104 may look up the received data item's metadata definition in metadata source 126 and determine a data transformation is required. The distributed event streaming system 104 may retrieve one or more data transformation rules from the metadata source 126, in an embodiment. The distributed event streaming system 104 then performs the required transformation and converts data item in 112 into 114.

Furthermore, metadata source 126 may also include rules governing data access in distributed event streaming system 104, and data container platform 108. These rules only allow users or processes with approval to access data while data is in distributed event streaming system 104 and data container platform 108. Unauthorized user access will be denied, and an unauthorized process will not be able to execute. For example, sensitive data may be associated with a defined rule that governs access to that data. Then, only identified users with approved rights to the sensitive data may access the data based on the rule.

The outputs of application(s) processing the accessible data items 114 may be provided to other components or devices in system 100, such as data items 116 and 118 for a business intelligence system 106 or as information items 120 for one or more decision processes 122.

2.2. Distributed Event Streaming System

System 100 comprises a distributed event streaming system 104 that receives validated data streams 112 as input and parses or transforms them into accessible data items 114 from some or all of the validated data streams 112.

The validated data streams 112 comprise data field values (or features) captured or gathered from the data ingestor 102 receiving vehicular data streams 110 from a vehicle 130. In an embodiment, a standard messaging protocol, such as Message Queuing Telemetry Transport (MQTT), is used to validate data streams at the data ingestor 102. These data field values in the validated data streams may include, but are not necessarily limited to only, time sensitive data, non-time sensitive data, geographic location-specific data, vehicular monitoring data, sensor data, operational data, etc.

The distributed event streaming system 104 may parse out the validated data streams 112 based on a shared attribute, in an embodiment. The resulting accessible data items 114 may be made accessible, or available, by an application programming interface, in an embodiment. In other embodiments, the accessible data items 114 may be delivered to a particular application in the data container platform 108. In yet other embodiments, the accessible data items 114 may be stored in the data container platform 108 in computer readable storage media.

The distributed event streaming system 104 may also perform data transformation based on a transformation rule defined in metadata source 126 to convert data item embodiment 112 to the expected data item embodiment 114, as described above. For example, data streams 112 may include useful information that needs transformation into a different format. One type of vehicle may report data in a particular format, such as rainfall expressed as a percentage. A transformation rule may be defined in the metadata source 126 to translate the percentage number into milliliters (mL). For example, the transformation rule may be defined to multiple the percentage number times 100, then divide by 15 and add 8. Thus, the distributed event streaming system 104 would be able to identify the portion of the data stream 112 that includes the percentage number by a metadata identifier and apply the transformation rule to that percentage number to deliver the milliliters number to the data container platform 108.

Additionally, optionally or alternatively, in operational scenarios in which multiple applications are deployed, data items used by a later executed application (e.g., insurance data applications, business intelligence systems, etc.) may incorporate information or data field values derived from output of an earlier executed application (e.g., earlier executed application(s), etc.).

The data items 114 can be directly or indirectly fed, for example by the distributed event streaming system 104, as input into one or more applications in the data container platform 108.

2.3. Business Intelligence System

System 100 further comprises a business intelligence system 106 that operates with one or more computing devices to receive processed information from the data container platform 108. Example computing devices may include, but are not limited to only, any of: computer servers, desktop computers, personal computers, computer clusters, mainframe computers, parallel computers, supercomputers, etc.

A business intelligence system 106 may receive output processed information data items 116 and 118 from applications in a data container platform 108. Example business intelligence system 106 may include, but not limited to, any of: an insurance application receiving data related to driving behavior, a government entity receiving anonymized vehicular data related to gas consumption, a transportation network company gathering information on efficient routing through dense cities, and so on. In some operational scenarios, the business intelligence system 106 may receive data items 116 and 118 that are aggregated and anonymized to shield the privacy of users of the vehicle 130. Further, the data container platform 108 may gather and transform data received across multiple geographic regions, at different time periods, to generate data items 116 and/or 118 that are useful and relevant to the aims of the business intelligence system 106. The business intelligence system 106 may then use machine learning and/or artificial intelligence techniques to further manipulate, transform, and/or derive other data. As used herein, business intelligence systems that receive data items 116 and 118 may also be referred to as "BI systems."

Some or all of the data items 116 and 118 as generated by the data container platform 108 can also be directly or indirectly fed, for example by computing devices, as input into decision processes 122. Data items produced as output of applications may also be transmitted as information items 120 to decision processes 122.

2.4. Decision Processes

Decision processes 122 may be implemented in system 100 for generating a response or causing an action to occur at a vehicle 130. Example responses or actions generated by decision processes 122 may include, but is not necessarily limited to, any of: a notification on a display system in the vehicle 130, an indication of an event occurring as tracked by an application on the data container platform 108, a notification of a vehicular malfunction detected at vehicle 130, a weather forecast presented to a viewing user of the vehicle 130, an insurance discount message applied to driver's insurance associated with the vehicle 130, a discount applied to a parking garage ticket located near the vehicle 130, and so forth. In some operational scenarios, some or all of decision processes 122 used to generate responses or actions 124 may be implemented as internal or external computing systems communicatively coupled to the data container platform 108.

In some operational scenarios, accessible data items 114 received at the data container platform 108 may be enriched with metadata 128 received from a metadata source 126 and may be fed directly or indirectly to an application and/or a distributed event streaming system 104 to be repackaged as a topic data stream within the data container platform 108. An application may then output an information item 120 that triggers one or more decision processes 122. Based on the information item 120, one or more actions 124 may be caused to be performed at the vehicle 130 by the one or more decision processes 122.

Decision process(es) 122 may incorporate business logic or criteria that trigger action(s) 124 to be performed at a vehicle 130. In another embodiment, one or more decision processes 122 may operate collaboratively on the received information items 120 to generate a response or action 124. In yet further embodiments, decision processes 122 may be incorporated in a business intelligence system 106. In an embodiment, decision processes 122 may operate as third-party services that receive information items 120 through an application programming interface or other data interface.

In one embodiment, a decision process 122 may be implemented in a neural network or other machine learning or artificial intelligence technique. A training model may incorporate received information items 120 from the data container platform 108 until a desired amount of training data is gathered. For example, vehicular operational data may be gathered from a multitude of vehicles (e.g., vehicle 130) to train a machine learning model on usage of a particular feature of the vehicles 130, such as blind spot detection sensors. Using various heuristics engines and machine learning techniques, a decision process 122 may identify a pattern to dynamically notify the viewing user of the vehicle 130 of an impending collision. This notification could appear as an action 124 triggered by the received information items 120.

The distributed event streaming system 104 may transform outputted data of applications into one or more topic data streams for use by other applications within the data container platform 108. Output of applications are then transmitted as information items 120 to one or more decision processes 122. In an embodiment, the information items 120 are fed directly to the one or more decision processes 122. In another embodiment, the information items 120 are retrieved via an application programming interface by the one or more decision processes 122.

Decision processes 122 receive the information items that are processed or derived from output of applications in the data container platform 108 and/or metadata 128 received from a metadata source 126. For example, decision processes 122 may reside within external applications from the data container platform 108. As another example, decision processes 122 may be part of a business intelligence system, service, or platform.

2.5. Miscellaneous

System 100 illustrates only one of many possible arrangements of components configured to provide the functionality described herein. Other arrangements may include fewer, additional, or different components, and the division of work between the components may vary depending on the arrangement. For instance, data ingestion techniques as described herein may be practiced in other types of systems that are not necessarily related to standard messaging protocols. In some operational scenarios, computing devices other than a distributed event streaming system as described herein may be used to route messages to applications in the data container platform 108 as well as cause actions 124 to be performed at a vehicle 130 by one or more decision processes 122. Confirmation that an action 124 was performed at the vehicle 130 may be received by the system 100 at data ingestor 102.

3.0. Functional Overview

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Multi-Layered Large Scale Data Collaboration

Figure 2A:
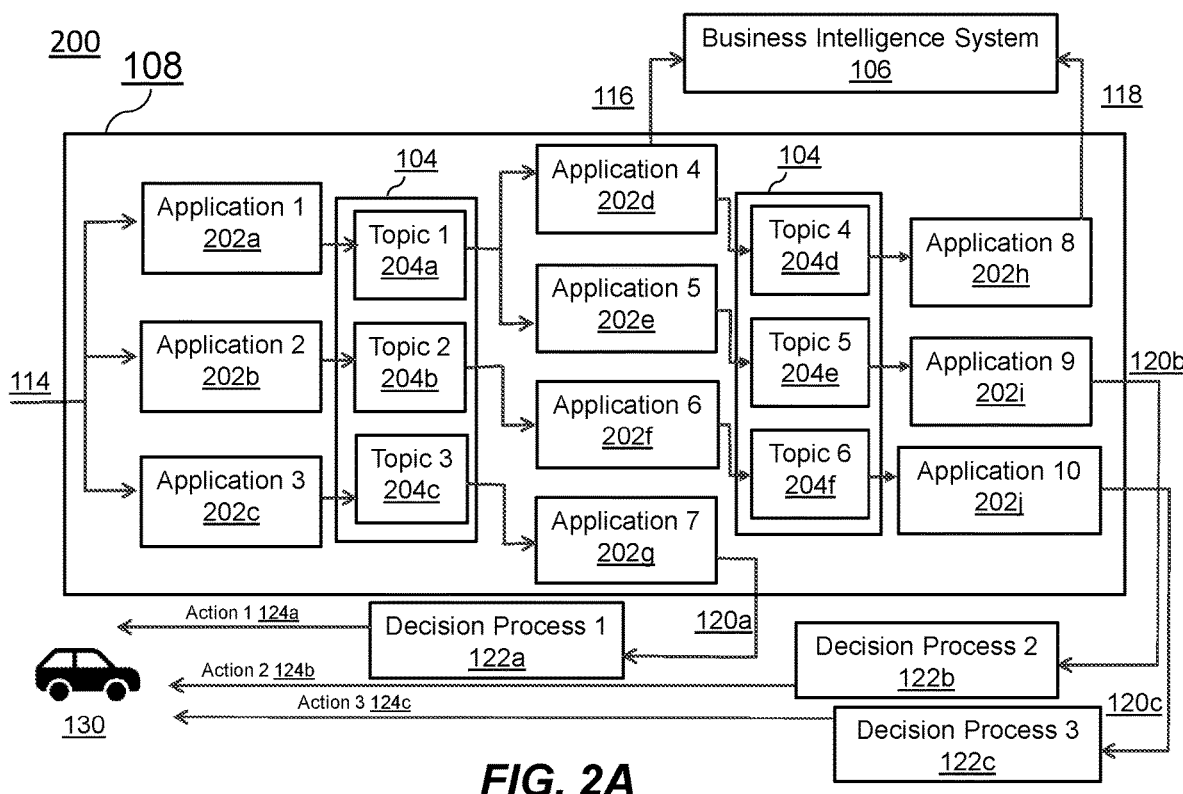
FIG. 2A illustrates an example block diagram for a data container platform, illustrating an example data flow.

Large scale data collaboration is achieved in the example system 200 illustrated in FIG. 2A. Vehicle data flows through validation, ingestion, and a distributed event streaming system before arriving at the data container platform 108 as accessible data items 114 via one or more application programming interfaces. In the example depicted in FIG. 2A, three layers of computing nodes, where each node runs a unique computing application (e.g., application 1 through application 10), are comprised within the data container platform 108. In an embodiment, vehicle data may flow through different instances of the data container platform 108. For example, different instances of the data container platform 108 may exist to support different application releases, on demand patterns, blue/green deployments, feature-flags, legal constraints (e.g., handling data separation at the data source), and other business use cases. The distribution pattern remains the same on each instance where there are multiple instances of the data container platform 108.

Each computing node may collaborate with a node in the next layer for data processing. At the end of any computing path, various results can be achieved. For instance, business intelligence is generated as data items 116 from application 4 202d and data items 118 from application 8 202h.

As another example, decision points may be reached, such as output of application 7 202g sending an indication 120a to an external computing application that executes decision process 1 122a which then generates the appropriate action to be sent back to the vehicle 130. Similarly, as output to Application 9 202i, information item 120b is sent to decision process 2 122b, which may be executed at an external application, to cause an appropriate action to occur at the vehicle 130. Additionally, as output to Application 10 202j, information item 120c is sent to an external computing application that implements decision process 3 122c which then causes an action 3 124c to be performed at vehicle 130. To illustrate this example, suppose that an application, such as a near real-time vehicular status analysis application, receives data regarding driving behavior and transforms or processes the data into a topic, such as "driving behavior," that is received as input for a trigger such that some artificial intelligence (AI) or machine learning (ML) is performed, creating a driving safety score. A threshold score may trigger a decision process on another application, such as a driver safety application to detect unsafe driving behavior. The action produced by the driver safety application could, for example, create a notification at the vehicle that the driver may be drowsy based on driving behavior.

Though only three layers of computing nodes are illustrated in system 200, the data container platform 108 supports as many layers of computing nodes as needed. Thus, the system 200 may scale without limit.

The system has the flexibility to integrate with a metadata source system (depicted in FIG. 1 as metadata source 126) which governs data schema management, in an embodiment.

3.2. Shared Resources at the Data Container Platform

Figure 2B:
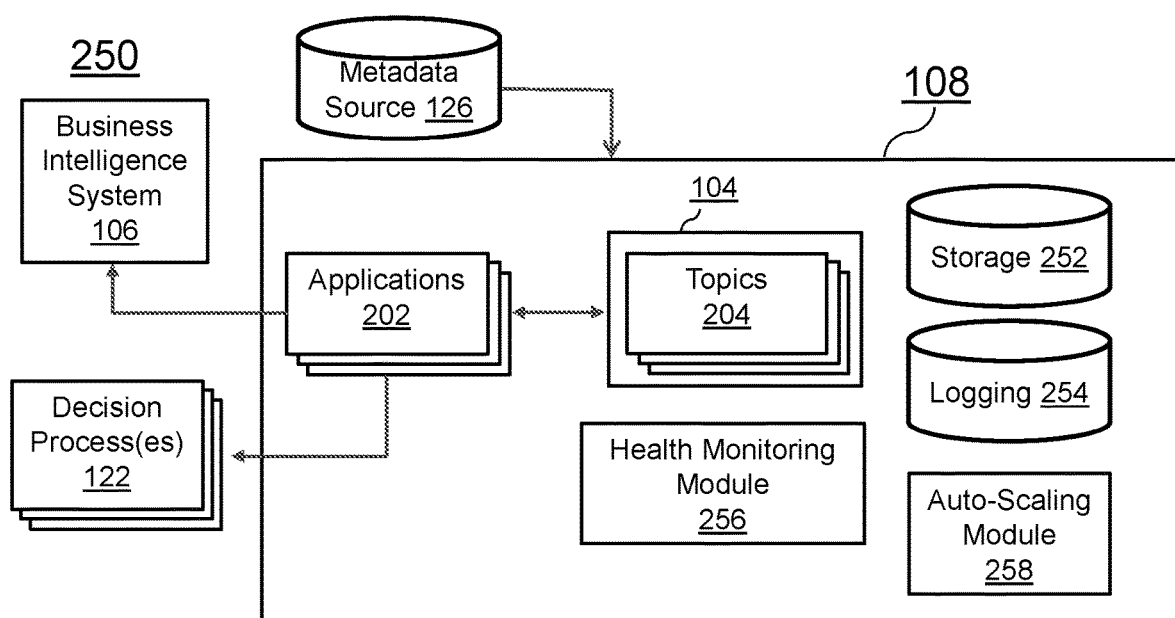
FIG. 2B illustrates an example high-level block diagram for the data container platform for large scale collaboration of computing applications.

By way of illustration but not limitation, FIG. 2B illustrates an example data container platform 108 that provides shared services, including storage 252, logging 254, health monitoring as executed by a health monitoring module 256, and auto-scaling services provided by an auto-scaling module 258. All computing applications can be deployed as containers, such that each container is able to access any of the shared services.

Storage 252 includes data storage needed to implement the Lambda Architecture Framework. For example, because data is streamed using both batch processing and speed processing layers, storage 252 is used to store data as needed from either batch processing or speed processing.

Logging 254 is a shared service implemented in the Lambda Architecture Framework in which an event log for the data being streamed using the Lambda Architecture Framework may be produced. For example, logging is needed for microservices, or applications as well as the distributed event streaming system.

A Health Monitoring Module 256 is a shared service that performs health monitoring capabilities to monitor the operational health of applications 202 on the data container platform 108.

Auto-Scaling Module 258 is a shared service that implements an auto-scaling policy that adjusts the provisioned concurrency levels automatically based on a configuration.

3.3. Computing Paths Using Flexible Message Routing

Returning to FIG. 2A, an example block diagram for a data container platform (e.g., 108 of FIG. 1, etc.), is illustrated according to one embodiment. The data container platform as illustrated in FIG. 2A may be implemented with one or more computing devices. The data container platform comprises any combination of hardware and software configured to implement the various logical components described herein, including components such as applications 202 and topics 204.

The data container platform may include computer processors having one or more memories storing instructions for implementing some or all the components described herein, one or more hardware processors configured to execute the instructions stored in the one or more memories, and various data repositories in the one or more memories for storing data structures utilized and manipulated by the components.

In an embodiment, operations performed in some or all the blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. FIG. 2A illustrates but one example block diagram for a data container platform. Other possible block diagrams and/or configurations may involve additional or fewer blocks, in potentially varying arrangements.

In some operational scenarios, system 200 may be implemented as a computing system comprising a business intelligence system 106 and external applications implementing decision processes 122.

FIG. 2A depicts, as an example, a simple computing path formed by collaborating computing application 1 202a and application 4 202d. Application 4 decides enough data is available to generate a business intelligence report. Application 4 may integrate with an external BI system 106 to generate that report and transmit the data item 116 to the external BI system 106.

FIG. 2A also depicts, as another example, another computing path formed by just application 3 202c and application 7 202g. Here, application 7 202g has reached an actionable decision point, and this application is free to integrate with an external application called Decision Process 1 122a. This application can take the appropriate action based on the decision point arrived by application 7 202g, and as shown in FIG. 2A, action 1 124a is sent to the vehicle 130. For example, while a vehicle's battery is being charged, the battery temperature is being monitored by one or more sensors. In case of very high temperature being detected in Application 7 202g, this information 120a is immediately delivered to Decision Process 1 122a. Decision Process 1 122a decides to stop the charge and sends Action 124a to vehicle to stop the battery from being charged.

As another example, suppose Application 9 202i and Application 10 202j receive separate data to indicate a car accident occurred on a major road, such as via traffic data collected from other vehicles, or government data feed, etc. Decision Process 2 122b may send a traffic incident alert to the vehicle's infotainment system, while Decision Process 3 122c may update the vehicle's current navigation information and generate alternative routes.

FIG. 2A further depicts message routing flexibility. Based on the topics each computing application subscribes to, and/or the distributed event streaming system 104, data can be routed to any application as the system owner configures. In this example, when applying the Lambda Architecture Framework, an event-driven data processing architecture designed to handle massive quantities of data, then any of application 1 202a, application 2 202b, or application 3 202c could receive batched data or streamed data. This enables flexible message routing of data streams such that applications have access to data when they need it.

Some or all these results may be outputted by the applications 202 (or decision processes 122) to other components of an overall system such as 100 of FIG. 1.

3.4. Real Time Vehicle Data Driven Decisioning

Figure 3:
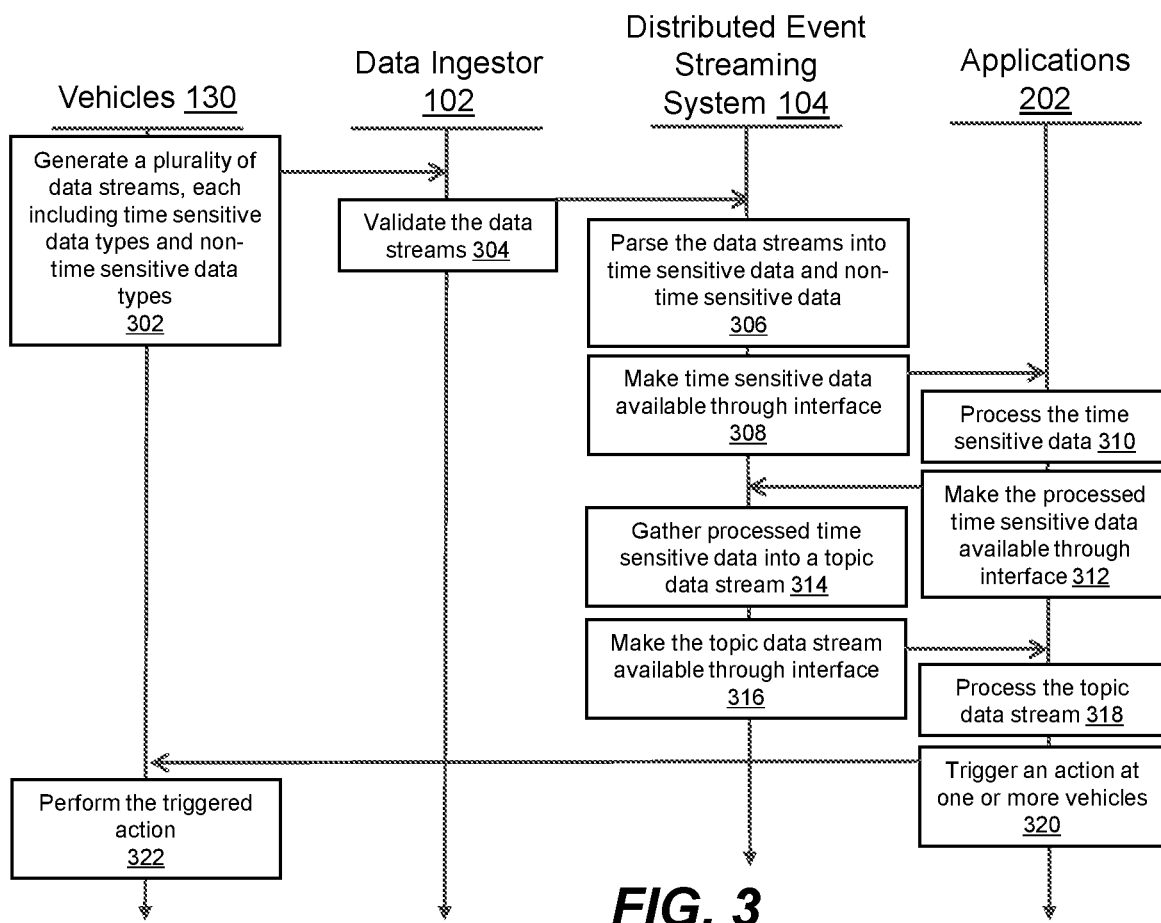
FIG. 3 illustrates an example interaction flow diagram, representing an example data flow path for large scale collaboration of computing applications.

FIG. 3 illustrates an example interaction flow diagram, representing an example data flow path for large scale collaboration of computing applications, according to an embodiment. In this example, multiple vehicles 130 interact with a data ingestor 102, distributed event streaming system 104, and applications 202 as described herein within a data container platform 108. Vehicles 130 generate 302 a plurality of data streams, each including time sensitive data types and non-time sensitive data types. The plurality of data streams generated 302 at vehicles (e.g., vehicle 130) are communicated to the data ingestor 102 which validates 304 the data streams.

The distributed event streaming system 104 receives the validated 304 data streams and then parses 306 the data streams into time sensitive data and non-time sensitive data. Because a Lambda Architecture Framework is used, a batch processing layer and a speed processing layer is used in a distributed processing system (e.g., the distributed event streaming system 104) to parse the information items by, for example, attribute, in this example time sensitive versus non-time sensitive data. In other embodiments, the distributed event streaming system 104 may parse the data streams based on other attributes, such as location-specific data, diagnostic data, and other monitoring data.

Continuing this example, the distributed event streaming system 104 makes time sensitive data available through an interface 308. An application programming interface may allow access to time sensitive data (e.g., to be made available 308) to applications 202, for example.

A particular application 202 of the applications 202 may, through such an example API, send a request to retrieve the time sensitive data made available by the distributed event streaming system 104 and processes 310 the time sensitive data. This may include transforming the data, inputting the data into an algorithm, business logic, recommendation system, or any number of methods. In an embodiment, the particular application 202 may be an application that anonymizes the data and transforms it by enriching the data with metadata. In another embodiment, the particular application 202 may process the information through a pattern detection matching system to detect a potential vehicle malfunction. In other embodiments, the first particular application 202 processes 310 the time sensitive data in a myriad of ways and then makes 312 the processed time sensitive data available through an interface.

The distributed event streaming system 104 may then, through the interface such as an application programming interface, gather 314 processed time sensitive data into a topic data stream. In a MQTT messaging solution, the MQTT broker uses the topic of a message to decide which client receives which message. Here, each message, or data item, has a topic, or a character string that the broker uses to filter messages. In this example embodiment, the MQTT broker is the data container platform 108 that enables applications 202 to publish to a topic and have other applications 202 subscribe to a topic. Referring to FIG. 2A, Application 1 202*a* is a publisher to Topic 1 204*a*. Application 4 202*d* and application 5 202*e* are subscribers to Topic 1 204*a*. Thus, the gathering 314 of processed time sensitive data into a topic data stream makes the distributed event streaming system 104 a publisher of the topic, in one embodiment. The processed time sensitive data is transformed by the distributed event streaming system 104 to append the topic to the data stream of time sensitive data, or a topic data stream. The topic data stream is then made available through an interface 316 by the distributed event streaming system 104, such as by the application programming interface used in step 308.

A second application 202 then performs step 318 and processes 318 the topic data stream. In this example, the second application 202 is a subscriber to the topic in the data container platform 108. In another embodiment, the second application 202 retrieves the topic data stream made available through the interface 316 and processes 318 the topic data stream. The processing 318 may involve any transformation of the data, such as through an algorithm, a pattern matching system, machine learning, neural networks, artificial intelligence, business logic, recommendation system, etc. The second application 202 may trigger 320 an action at one or more vehicles based on the processing 318. This causes the action to be performed 322 at the vehicles (e.g., vehicle 130).

For example, referring back to FIG. 2A, application 3 202*c*, such as an application that anonymizes vehicle data, may receive time sensitive data (e.g., step 308) and perform near-real time analysis on the data (e.g., process 310 the data), e.g., anonymize the data and remove personal identifying information. The output of application 3 is transformed into a topic data stream, where data items have a topic 3 204*c* generated by the distributed streaming system 104. Application 7 202*g*, is subscribed to the topic 3 204*c* (e.g., step 314 and 316 of FIG. 3), based on the MQTT protocol, such that Application 7 202*g* receives the topic data stream. Application 7, in one embodiment, may be an advanced driver assist application that enables autonomous driving and support to drivers. Application 7 202*g* may reach a decision point based on some criteria (step 318), such as choosing between 1) taking action, 2) generating a report, or 3) passing the data to another downstream party for more processing. Based on business logic and the topic data stream, an action 1 124*a* is triggered 320. An external application (e.g., decision process 1 122*a*) may be messaged to perform the triggered action 322. In this way, large scale collaboration between application 3 202*c* and application 7 202*g* occurs such that the data owner can set up this flow at any time and start data ingestion. This collaboration is controlled by the developer via a set of APIs. This workflow, in some embodiments, could scale horizontally without limit.

Figure 4A:
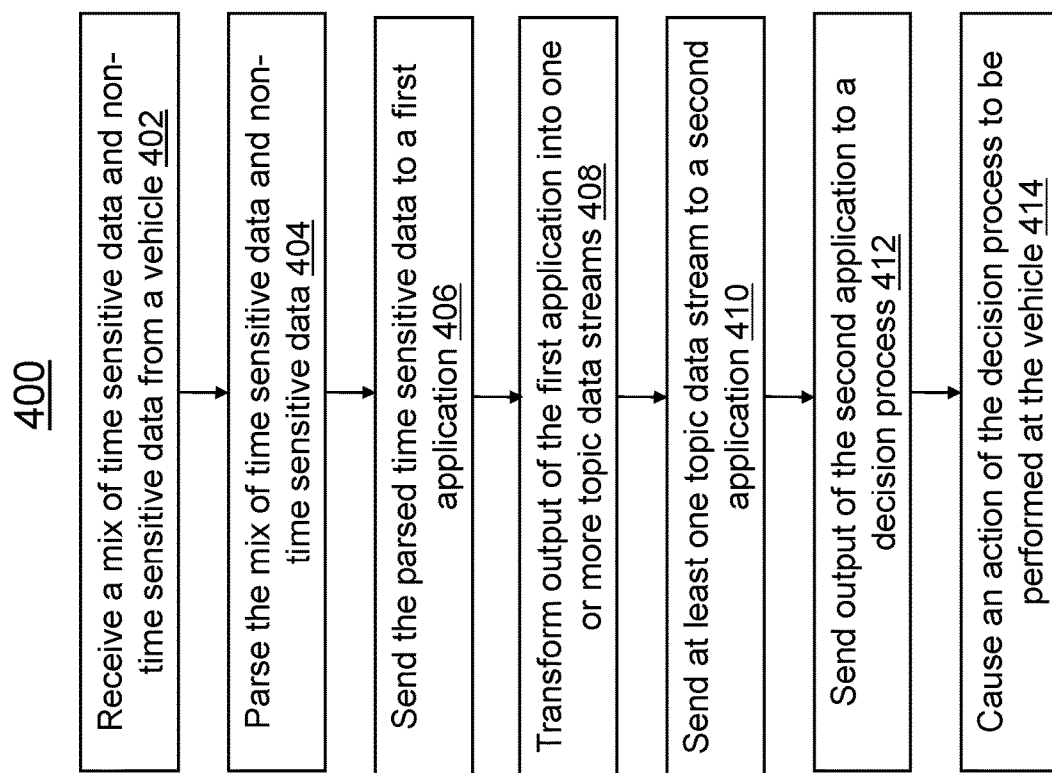
FIG. 4A, FIG. 4B, FIG. 4C, and FIG. 4D illustrate example flows 400, 420, 440 and 460, respectively, for generating a response from large scale collaboration of computing applications.

FIG. 4A, FIG. 4B, FIG. 4C, and FIG. 4D illustrate example flows 400, 420, 440 and 460 for generating a response from large scale collaboration of computing applications, according to an embodiment. FIG. 4A illustrates an example flow 400 for near real-time decisioning on vehicle data, according to an embodiment. The various elements of flow 400 may be performed in a variety of systems (e.g., one or more computing devices, etc.), including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. Flow 400 illustrates but one example flow for near real-time decisioning on vehicle data. Other flows may involve additional or fewer steps, in potentially varying arrangements.

Block 402 comprises receiving a mix of time sensitive data and non-time sensitive data from a vehicle (e.g., 130 of FIG. 1, FIG. 2A, etc.) in a data ingestion phase. The data ingestion may occur at any time.

Block 404 comprises parsing the mix to time sensitive data and non-time sensitive data.

Block 406 comprises sending the parsed time sensitive data to a first application. FIG. 2A illustrates parsed time sensitive data being sent to application 3 202*c* (as referenced in the example above with respect to FIG. 3). In a Lambda Architecture Framework, the speed layer processes data streams in real time and provides the time sensitive data to the first application. This is performed by the distributed event streaming system 104.

Block 408 comprises transforming output of the first application into one or more topic data streams. Returning to the example above with respect to FIG. 3, topic 3 204*c* is generated by the distributed event streaming system 104 and application 3 202*c* is the publisher of topic 3 204*c*. A topic data stream includes the data transformed by the application 202 that have the same topic.

Block 410 comprises sending at least one topic data stream to a second application. Returning to the above example, application 7 202*g* receives messages from topic 3 204*c*, or a topic data stream, because it is a subscriber to the topic. In a MQTT messaging solution, the MQTT broker, data container platform 108, filters messages by topic to subscribers.

Block 412 comprises sending output of the second application to a decision process. A decision process is implemented as an external application, in an embodiment. The decision process may determine whether an action is triggered.

Block 414 comprises causing an action of the decision process to be performed at the vehicle. The action to be performed at the vehicle may include a notification, a vehicle firmware update, and the like.

4.0. Example Process Flows

Figure 4B:
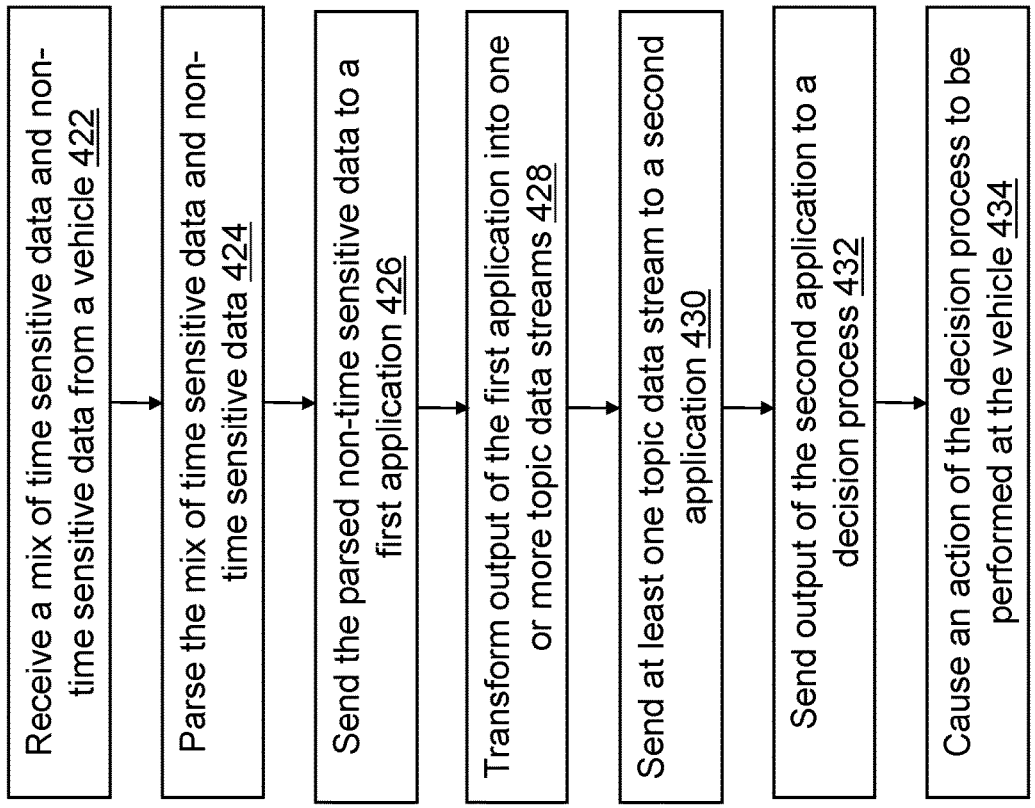

FIG. 4B illustrates an example process flow according to an embodiment. In some embodiments, one or more computing devices or components may perform this process flow. In block 422, a system as described herein generates receives a mix of time sensitive data and non-time sensitive data from a vehicle.

In block 424, the system parses the mix of time sensitive data and non-time sensitive data.

In block 426, the system sends the parsed non-time sensitive data to a first application. Because the data is non-time sensitive, the first application calls one or more application programming interfaces to create several instances of applications that create their own horizontal workflows to process the data at a user-specified time. A workflow is a series of sequential tasks that are carried out based on defined rules or conditions to execute a business process. In other words, a workflow is a collection of data, rules, and tasks that need to be completed to achieve a certain business outcome. A horizontal workflow is created sequentially over time.

In block 428, the system transforms the output of the first application into one or more topic data streams.

In block 430, the system sends at least one topic data stream to a second application.

In block 432, the system sends output of the second application to a decision process.

In block 434, the system causes an action of the decision process to be performed at the vehicle.

Figure 4C:
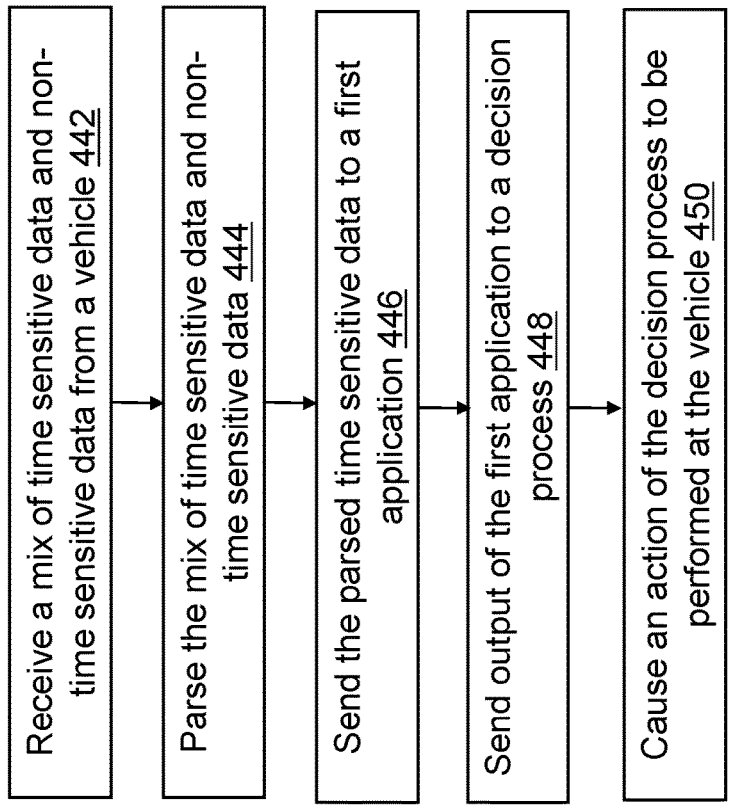

FIG. 4C illustrates an example process flow according to an embodiment. In some embodiments, one or more computing devices or components may perform this process flow. In block 442, a system as described herein receives a mix of time sensitive data and non-time sensitive data from a vehicle.

In block 444, the system parses the mix of time sensitive data and non-time sensitive data.

In block 446, the system sends the parsed time sensitive data to a first application.

In block 448, the system sends output of the first application to a decision process.

In block 450, the system causes an action of the decision process to be performed at the vehicle.

Figure 4D:
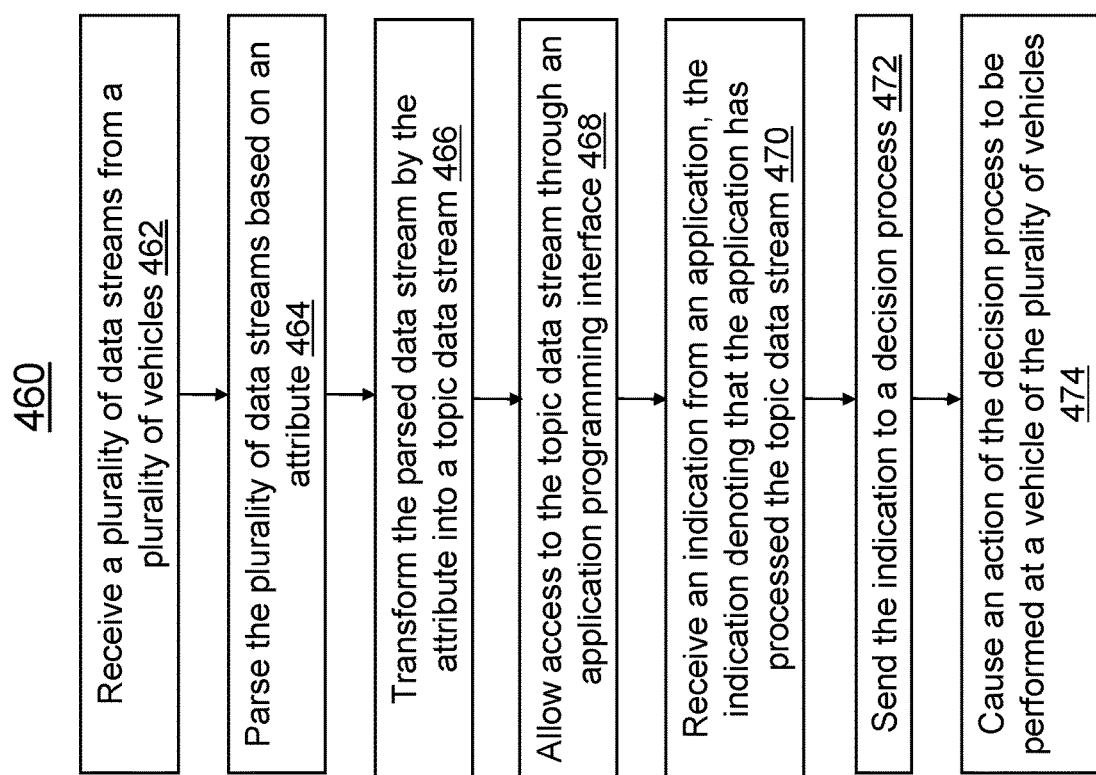

FIG. 4D illustrates an example process flow according to an embodiment. In some embodiments, one or more computing devices or components may perform this process flow. In block 462, a system as described herein receives a plurality of data streams from a plurality of vehicles.

In block 464, the system parses the plurality of data streams based on an attribute.

In block 466, the system transforms the parsed data stream by the attribute into a topic data stream.

In block 468, the system allows access to the topic data stream through an application programming interface (API), such that topic data streams are made available through the API.

In block 470, the system receives an indication from an application, the indication denoting that the application has processed the topic data stream.

In block 472, the system sends the indication to a decision process.

In block 474, the system causes an action of the decision process to be performed at a vehicle of the plurality of vehicles.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
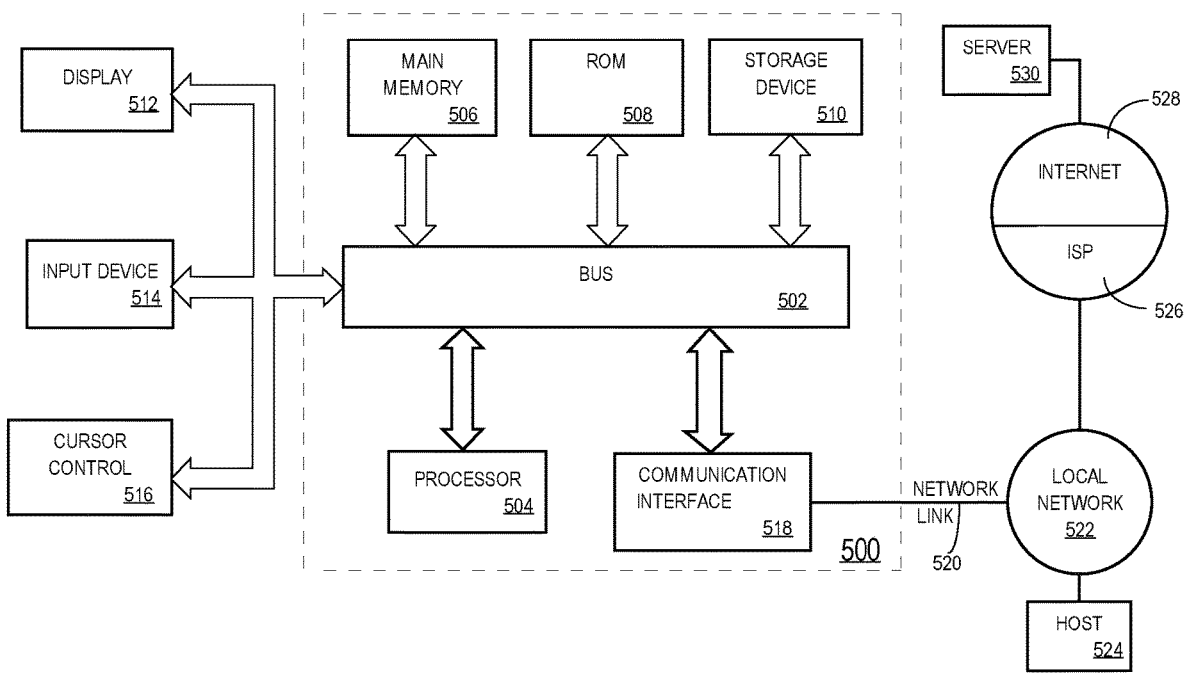
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 505, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Figure 6:
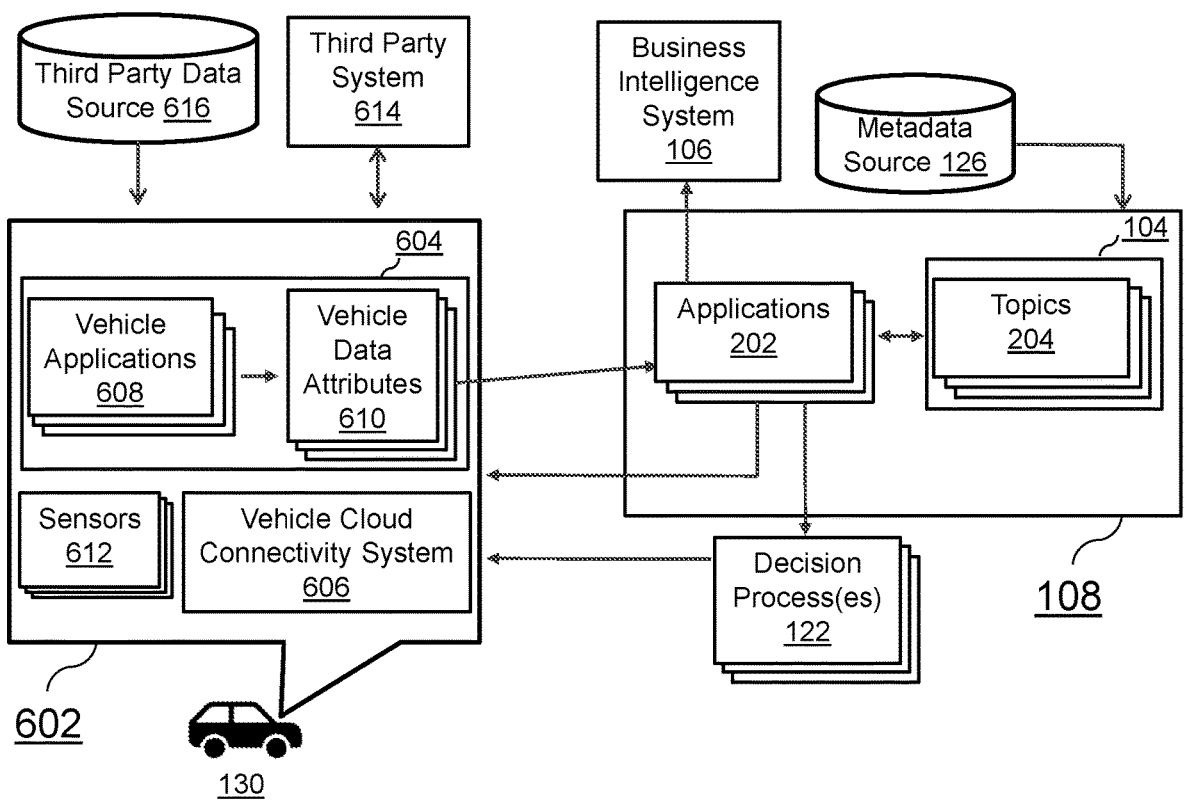
FIG. 6 illustrates an example high-level block diagram of a vehicle computing system for the data container platform for large scale collaboration of computing applications.

FIG. 6 illustrates an example system 600 that includes a vehicle computing system 602 embedded within a vehicle 130 and an instance of a data container platform 108. The vehicle computing system 602 includes a vehicle operating system 604 and a vehicle cloud connectivity system 606. Within the vehicle operating system 604, vehicle applications 608 generate vehicle data attributes 610. The vehicle data attributes 610 are communicated to applications 202 within the data container platform 108 through the vehicle cloud connectivity system 606. The vehicle cloud connectivity system 606 may include network connectivity hardware such as Bluetooth, cellular hardware, and other network components to connect to the Internet. Sensors 612 are included in the vehicle computing system 602, such as LIDAR, computer vision, water sensors, collision detection systems, and so forth. Sensors 612 communicate with vehicle applications 608 on the vehicle operating system 604 to generate vehicle data attributes 610.

Through the network and Internet, a third party data source 616 may send data to the vehicle computing system 602 through the vehicle cloud connectivity system 606, Such data may include weather data, GPS data, and any type of data for processing and use by the vehicle computing system 602. Additionally, a third party system 614 may communicate with the vehicle computing system 602, such as sending and receiving information, requests, and queries. Based on this information obtained from the cloud, or a third party data source 616 and/or a third party system 614, vehicle applications 608 may generate vehicle data attributes 610 that incorporate this information for further processing by the data container platform 108.

Through the network and the Internet, the data container platform 108 receives the vehicle data attributes 610 through one or more applications 202 configured to receive the data. For example, a weather application 202 on the data container platform 108 may be configured to receive vehicle data attributes 610 such as sensor data recording rainfall, temperature, and other weather-related data. Vehicle applications 608 may individually send data to such a weather application 202. In another embodiment, a vehicle application 608 may collect weather-related data and package the data as a vehicle data attribute 610 to be received by the weather application 202.

Vehicle data attributes 610 may then be transformed by a distributed event streaming system 104 to become topics 204, as described above with respect to FIG. 2. Similarly, applications 202 may communicate vehicle data attributes 610 and/or the topics 204 derived from them to a business intelligence system 106 and/or decision processes 122 that result in actions that may be performed based on the vehicle data attributes, topics 204, or any combination thereof. Metadata from a metadata source 126 may be used by the data container platform 108 to generate topics 204, in an embodiment.

In an embodiment, an application 202 may operate outside of the data container platform 108 and communicate vehicle data attributes 610 to the distributed event streaming system 104 to produce topics 204 on the data container platform 108 through one or more networks implemented by the vehicle cloud connectivity system 606. For example, a mobile device within the vehicle 130, such as a mobile phone, may be communicatively coupled to the vehicle through the vehicle cloud connectivity system 606. Vehicle data attributes 610, such as driving behavior, may be communicated to the mobile device through an application 202 on the mobile device. The application 202 may be an insurance application to decide whether a discount for good driving behavior should be applied, for example. The application 202 may produce topics 204 based on the vehicle data attributes 610 received.

In an embodiment, the vehicle computing system 602 prioritizes the processing and communication of certain time sensitive vehicle data attributes to the data container platform 108 in accordance with a prioritization schema. For instance, data attributes used for navigation, including perception, localization, path planning, intention prediction, and/or other navigation topics, are given the highest process priority where a majority of the processing power (e.g., 80 percent of the total processing capacity) and a majority of the network bandwidth (e.g., 75 percent of the total network bandwidth available) are reserved for processing of such data attributes. Other data attributes that are not for navigation can be given a lesser priority and thereby a lesser predefined amount of processing power and a lesser predefined amount of network bandwidth. In addition, the processing of higher priority data attributes can supersede any currently processing threads on the vehicle computing system 602.

In another example of a prioritization schema, data attributes relating to a driver's health (e.g., heartrate data) can be given the highest priority; data attributes for navigation are given a second priority with an assignment of 90 percent of the processing power and 85 percent of the total network bandwidth; and other data attributes given a third priority and being assigned the remaining 10 percent of the processing power and 15 percent of the total network bandwidth. If a driver health threshold is reached, then the driver's health related data attributes is processed immediately superseding any currently running threads on the vehicle computing system 602 for the other data attributes. The decision process 122 may autonomously set the navigation of the vehicle to the nearest hospital to attend to a driver's medical emergency indicated by the health data attribute.

It can be appreciated that other predefined prioritization schemas having certain data attributes assigned to a predefined processing power and a predefined network bandwidth can be envisioned based on the present disclosure. The examples given herein are merely illustrative.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

generating, at a vehicle computing system located on a vehicle, a first plurality of data attributes using one or more vehicle applications configured to operate on a vehicle operating system on the vehicle computing system, the first plurality of data attributes associated with the vehicle;

retrieving, at the vehicle computing system, related information items associated with the first plurality of data attributes, directly from a third party source through a first cloud network connection, wherein the related information items include data and one or more actions to be performed on the vehicle received from the third party source, the third party source receives data from a data container platform instance, the vehicle computing system communicates with the third party source via the first cloud network connection;

performing, at the vehicle computing system, the one or more actions received from the third party;

generating, at the vehicle computing system, a second plurality of data attributes associated with the vehicle based on the retrieved related information items;

sending, from the vehicle computing system, the first plurality of data attributes and the second plurality of data attributes as a data stream to the data container platform instance through a second cloud network connection;

wherein an application at the data container platform instance accesses a topic data stream, the application is subscribed to a topic in the topic data stream created by the data container platform instance, the application sends data to a decision making process that causes an action to be sent to the vehicle computing system via a third cloud network connection; and performing, by the vehicle computing system, the action on the vehicle;

wherein the vehicle computing system processes data and actions based on a prioritization schema where higher priority items are processed using a higher percentage of processing capacity.

2. The method of claim 1, wherein the first plurality of data attributes comprises time sensitive data.

3. The method of claim 1, wherein the first plurality of data attributes comprises location-specific data.

4. The method of claim 1, wherein the first plurality of data attributes comprises vehicle operational data.

5. The method of claim 1, wherein the decision making process is implemented as one of: a neural network, other machine learning technique, or artificial intelligence technique.

6. The method of claim 1, wherein the third party source comprises a third party system.

7. The method of claim 1, wherein the first plurality of data attributes is generated based at least in part on data collected from one or more sensors on the vehicle.

8. One or more non-transitory computer-readable storage media, storing one or more sequences of instructions, which when executed by one or more processors cause performance of:
generating, at a vehicle computing system located on a vehicle, a first plurality of data attributes using one or more vehicle applications configured to operate on a vehicle operating system on the vehicle computing system, the first plurality of data attributes associated with the vehicle;
retrieving, at the vehicle computing system, related information items associated with the first plurality of data attributes, directly from a third party source through a first cloud network connection, wherein the related information items include data and one or more actions to be performed on the vehicle received from the third party source, the third party source receives data from a data container platform instance, the vehicle computing system communicates with the third party source via the first cloud network connection;
performing, at the vehicle computing system, the one or more actions received from the third party;
generating, at the vehicle computing system, a second plurality of data attributes associated with the vehicle based on the retrieved related information items;
sending, from the vehicle computing system, the first plurality of data attributes and the second plurality of data attributes as a data stream to the data container platform instance through a second cloud network connection;
wherein an application at the data container platform instance accesses a topic data stream, the application is subscribed to a topic in the topic data stream created by the data container platform instance, the application sends data to a decision making process that causes an action to be sent to the vehicle computing system via a third cloud network connection; and
performing, by the vehicle computing system, the action on the vehicle;
wherein the vehicle computing system processes data and actions based on a prioritization schema where higher priority items are processed using a higher percentage of processing capacity.

9. The one or more non-transitory computer readable media of claim 8, wherein the first plurality of data attributes comprises time sensitive data.

10. The one or more non-transitory computer readable media of claim 8, wherein the first plurality of data attributes comprises location-specific data.

11. The one or more non-transitory computer readable media of claim 8, wherein the first plurality of data attributes comprises vehicle operational data.

12. The one or more non-transitory computer readable media of claim 8, wherein the decision making process is implemented as one of: a neural network, other machine learning technique, or artificial intelligence technique.

13. The one or more non-transitory computer readable media of claim 8, wherein the third party source comprises a third party system.

14. The one or more non-transitory computer readable media of claim 8, wherein the first plurality of data attributes is generated based at least in part on data collected from one or more sensors on the vehicle.

15. An apparatus, comprising:
one or more computing processors;
a memory storing instructions, which when executed by the one or more processors, cause the one or more processors to perform:
generating, at a vehicle computing system located on a vehicle, a first plurality of data attributes using one or more vehicle applications configured to operate on a vehicle operating system on the vehicle computing system, the first plurality of data attributes associated with the vehicle;
retrieving, at the vehicle computing system, related information items associated with the first plurality of data attributes, directly from a third party source through a first cloud network connection, wherein the related information items include data and one or more actions to be performed on the vehicle received from the third party source, the third party source receives data from a data container platform instance, the vehicle computing system communicates with the third party source via the first cloud network connection;
performing, at the vehicle computing system, the one or more actions received from the third party;
generating, at the vehicle computing system, a second plurality of data attributes associated with the vehicle based on the retrieved related information items;
sending, from the vehicle computing system, the first plurality of data attributes and the second plurality of data attributes as a data stream to the data container platform instance through a second cloud network connection;
wherein an application at the data container platform instance accesses a topic data stream, the application is subscribed to a topic in the topic data stream created by the data container platform instance, the application sends data to a decision making process that causes an action to be sent to the vehicle computing system via a third cloud network connection; and
performing, by the vehicle computing system, the action on the vehicle;
wherein the vehicle computing system processes data and actions based on a prioritization schema where higher priority items are processed using a higher percentage of processing capacity.

16. The system of claim 15, wherein the first plurality of data attributes comprises time sensitive data.

17. The system of claim 15, wherein the first plurality of data attributes comprises location-specific data.

18. The system of claim 15, wherein the first plurality of data attributes comprises vehicle operational data.

19. The system of claim 15, wherein the decision making process is implemented as one of: a neural network, other machine learning technique, or artificial intelligence technique.

20. The system of claim 15, wherein the first plurality of data attributes is generated based at least in part on data collected from one or more sensors on the vehicle.

* * * * *